Dec. 23, 1924.
F. J. SCHMIDT
PRESSURE GAUGE VALVE DEVICE
Filed July 2, 1924
1,520,603
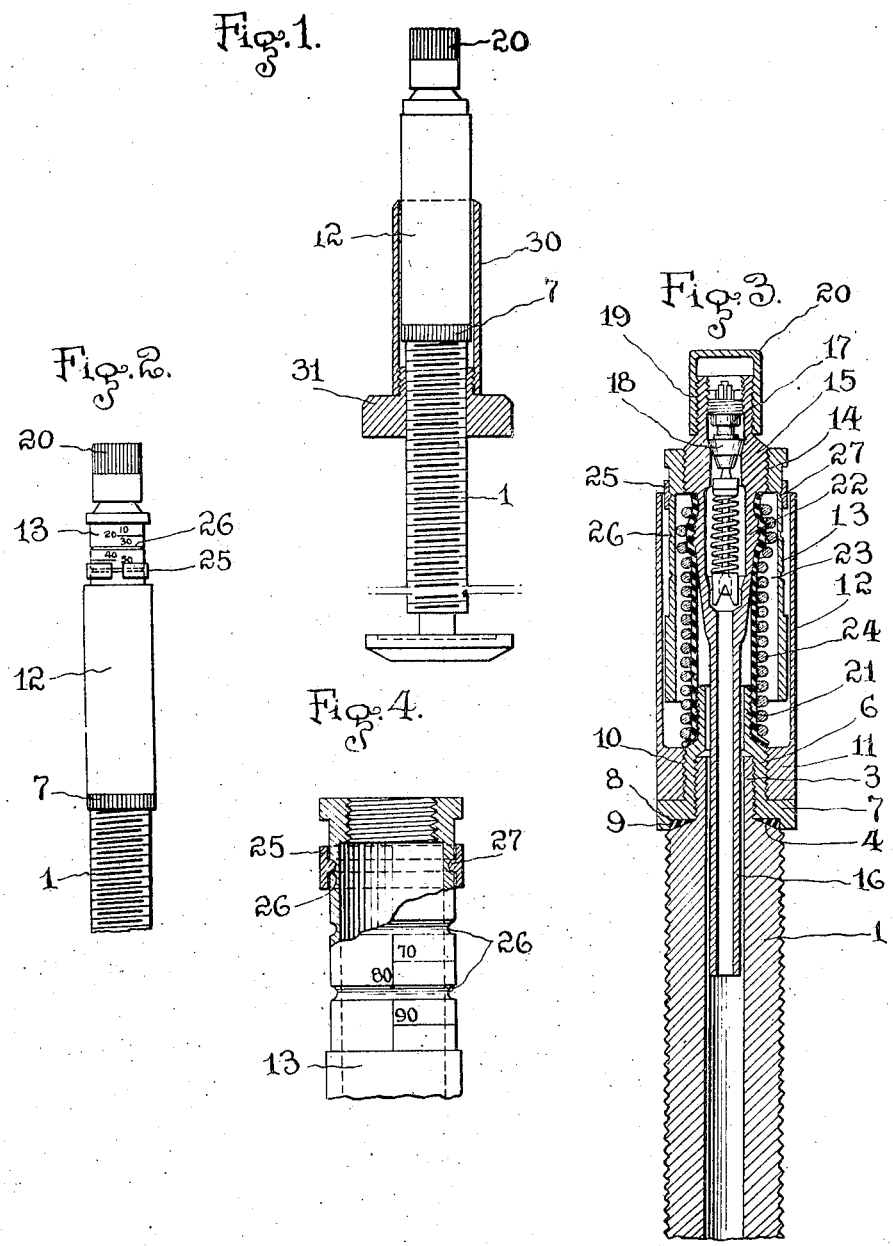
INVENTOR
Frank J. Schmidt
BY
ATTORNEY Patented Dec. 23, 1924.

1,520,603

UNITED STATES PATENT OFFICE.

FRANK J. SCHMIDT, OF JERSEY CITY, NEW JERSEY, ASSIGNOR TO DAVID S. MILLS, OF NEW YORK, N. Y.

PRESSURE-GAUGE VALVE DEVICE

Application filed July 2, 1924. Serial No. 723,736.

*To all whom it may concern:*

Be it known that I, FRANK J. SCHMIDT, a citizen of the United States, and resident of Jersey City, in the county of Hudson and State of New Jersey, have invented certain new and useful Improvements in Pressure-Gauge Valve Devices, of which the following is a specification.

The tire valve and gauge device of the present invention is of an improved arrangement and construction designed particularly to provide a gauge for use in pneumatic tires of a permanently attached type and which will have important features and advantages over valve gauge constructions, as heretofore proposed.

Valuable features of my improved construction consist in the arrangement whereby the device is made as a separable or detachable unitary structure adapted for securing engagement with the standard form of valve sleeve. As a result the important commercial advantage obtains that the improved valve device may be readily applied to the existing valve stems of standard form during use and may be attached to the valve stems of the renewed inner tubes as occasion requires. My improved structure is further of few parts of a form adapted for economical manufacture and further embodies special features of advantage including improved means for enhancing the visibility of the gauge to the observer to indicate the pressure in the tire. For the latter purpose there is provided, in addition to the usual graduated indicating marking, a signal band readily visible to the eye and indicating an approximate range of pressure to be maintained with the further provision that the signal band may be adjustable to meet the requirements of the user for indicating the pressure which it is desired to maintain in the specific installation. The signal band feature is accordingly adjustable to vary the range of pressure to be maintained and in consequence a single structure is produced adapted successfully to meet the widely varying requirements of the many sizes and types of tires in general use and the wide variations in pressure which it is desirable to maintain. A further advantageous feature of my improved construction provides that the air as introduced for the purpose of inflating the tire shall be conducted through the gauge device out of contact with the elastic sleeve thereof so as to eliminate the danger of oil grease or other foreign matter adhering to the rubber sleeve and impairing the efficiency and durability of the sleeve.

The described and other valuable features and advantages of my present invention will be more fully understood by reference to the accompanying drawings wherein like reference numerals are applied to the corresponding parts in the several views.

Referring to the drawings:

Fig. 1 is a view in side elevation illustrating a valve gauge device embodying the features of my invention applied to a valve sleeve or stem of standard form.

Fig. 2 is a similar view showing the parts in altered position as would occur under the action of a given air pressure.

Fig. 3 is an enlarged central and vertical sectional view and

Fig. 4 is an enlarged detail view partially in section and partially in elevation illustrating the signal band features.

In the approved embodiment of the features of the present invention, as illustrated, 1 indicates the valve sleeve or stem of tubular form having a central longitudinal bore therethrough and provided at its upper or outward end with a reduced threaded extension 3 and a tapered shoulder portion 4. The sleeve indicated, is of substantially universally used form and of standard dimensions as employed in the automotive industry. The upper portion thereof is interiorly threaded at 5 ordinarily to receive the usual valve insert and the threaded portion 3 and is of standard gauge and diameter to receive the standard size of pump couplings and valve caps in the manner well understood. My improved valve and gauge device is constructed as a unitary and separable attachment adapted to be received upon and secured by the threaded engagement to the threaded extension 3 of the valve sleeve and to remain as a permanent attachment thereto throughout the period of use of the inner tube to which the valve sleeve is attached and accordingly provides an indicating means of a permanently recording type.

My improved separable gauge device comprises a tubular securing member 6 internally threaded for securing engagement with the threads of the valve sleeve shoulder extension 3. The securing member 6 has integrally formed therewith an annular flange 7 formed at its underside with an annular recess 8 forming a seat for a packing washer positioned therein to engage the shoulder 4 of the valve sleeve so as to provide an air seal. The securing member 6 is externally threaded at 10 to receive thereon an internally threaded and inwardly directed annular shoulder 11 of a tubular stationary indicator member 12. Telescopically fitted within the stationary indicator member 12 there is provided a movable indicator member 13 of tubular form having its upper end secured by threaded engagement at 14 to an externally threaded shoulder portion of a plunger sleeve member 15. The plunger member 15 is of tubular form having at its lower end a sleeve extension 16 of reduced diameter telescopically fitted within the valve sleeve 1. At its uppermost portion the plunger member is preferably formed to cooperatively receive therein the usual or standard size valve insert or air intake valve 17. For this purpose it is provided with internal threads and the usual valve seat 18. At its upper end portion the plunger member 15 is externally threaded at 19, the diameter and gauge of the threaded portion conforming to that of the valve sleeve extension 3 and accordingly being adapted to receive the standard screw pump couplings and standard size detachable valve cap 20.

For the purpose of providing the usual flexible and sealing connection between a stationary part and the movable plunger member in the present construction, the upper portion 21 of the securing member 6 is externally ribbed or serrated and the plunger member 15 is provided with a portion 22 similarly externally serrated or ribbed. A tubular rubber sleeve 23 is fitted over the ribbed portions 21 and 22 and held in position by the retractile coil spring 24 superimposed upon the sleeve to have a compressive securing engagement with the portions 21 and 22 of the securing members 6 and plunger member 15 respectively. The securing members 6 and the plunger member 15 are thereby resiliently connected and the rubber sleeve member is firmly secured in position. In the construction, as disclosed, a space or clearance is provided for between the tubular extension 16 and the inner wall of the valve sleeve 1 and likewise between the inner wall of the securing member 6 and the peripheral surface of the tubular extension 16 thereby allowing for passage of the air upwardly within the elastic sleeve 23 whereby the plunger member with the attached movable indicator member 13 will be movable in response to the air pressure.

In the structure in so far as described it will be noted that the pressure gauge device is formed as a unitary structure adapted for attachment to the valve sleeve throughout the period of use of the inner tube to which the latter is attached. This desirable permanent use of the detachable gauge device is permitted by the desirable incorporation within the gauge structure of the air intake valve 16 which accordingly allows of the tire being inflated as desired through the pressure indicating device. In the present structure the air passing through the longitudinal bore of the plunger member 15 is conducted within the valve sleeve 1 so as to avoid direct contact with the rubber sleeve 23. It accordingly follows that in the inflating of the tire there is no danger of foreign matter, such as oil or dust adhering to the rubber sleeve and in consequence impairing its durability and its elastic qualities.

A further important feature of the present invention resides in the provision of a signal band for indicating a range of pressure which it may be desirable to maintain which may preferably be in addition to the usual graduated marking as customarily provided. In the illustrated construction, the movable indicator member 13 is provided upon its outer surface with the usual graduation and numerical marking to indicate the pressure and readable with reference to the upper surface of the stationary tubular indicator member 12. In addition thereto, and in accordance with my improvements, there is provided a signal band 25 mounted upon the movable indicator member 13 and adjustable thereon. This signal band 25 is desirably in the form of a band of spring metal of split ring form strung upon the tubular indicator member 13 to have a spring grip thereon. To provide clearance therefor the tubular indicator member is for a portion of its length of slightly reduced diameter so as to allow the signal band to pass freely within the tubular stationary member 12. For determining the proper position of the signal band and for yieldingly securing it in its adjusted position the indicator member 13 is provided with a series of annular grooves or recesses 26 and the signal band is provided on its inner surface with an annular rib or projection 27 of a size to register with the positioning grooves. It accordingly follows that the signal band may be readily adjusted for indicating a desirable range of pressure and when positioned is retained against accidental displacement. The signal band is of a width to indicate a suitable range of temperature which it is desired to maintain. It is further desirably colored by a suitable enamel so as to be readily visible to an observer at a distance thereby to enable reading of the indicator without close scrutiny. With the parts having the usual nickel finish, the employment of a signal band of red or magenta produces a pronounced and contrasting effect which may be observed at a glance thereby to enable the operator to determine the approximate pressure with little effort.

The outer surface of the flange 7 of the securing member 6 is desirably knurled or otherwise specially formed to facilitate the tightening of the gauge device in its attached position. As shown in Fig. 1 a protecting tubular sleeve element 30 may be fitted to surround the lower portion of the gauge device. This protective sleeve 30, as shown, being threaded at its lower end upon a clamping nut 31 in turn threaded upon the usual threads of the valve sleeve 1.

I have herein disclosed an approved embodiment of the features of my invention but various modifications may be made therein without departing from the scope of the invention as defined in the appended claims.

Having described my invention I claim:

1. A pressure gauge and valve device adapted to be permanently secured to a tubular valve sleeve, comprising a securing member internally threaded for securing engagement with the standard threads of the upper portion of the valve sleeve, a sealing washer interposed between the securing member and the valve sleeve, a stationary tubular indicator member threaded upon the securing member, a movable indicator member telescopically fitted within the stationary indicator member, a plunger member threaded within the movable indicator member, a resilient connecting sleeve secured at its upper end to the plunger member and at its lower end to the securing member, a retractile spring fitted within the indicator members and enclosing the resilient sleeve, said plunger member being of tubular form and having a reduced tubular sleeve extending within the bore of the valve sleeve and formed at its upper portion to receive therein the standard form of air intake valve and provided with a sleeve extension externally threaded to receive the standard size coupling of an inflated device, substantially as described.

2. In a device of the character described, the combination of a securing member internally threaded for securing engagement with the upper portion of a valve sleeve, said securing member at its underside being formed with a recess providing a seat for a sealing washer, a sealing washer fitted within said recess to engage the valve sleeve, a stationary tubular indicator member threaded upon the securing members, a movable indicator member telescopically fitted within the indicator member, a plunger member detachably secured to the movable indicator member, said plunger member being of tubular form extending longitudinally through the indicating members and having a reduced tubular sleeve extending within the valve sleeve bore and formed at its upper portion to receive therein an air intake valve, said securing member and said plunger member being formed with shoulder portions, a tubular elastic sleeve fitted upon the shoulder portions and a coiled retractile spring superimposed upon the resilient element providing a flexible connection between the plunger and securing member, substantially as described.

3. A pressure gauge device comprising a stationary indicator member and a movable indicator member operative to be movable with relation to the stationary member responsive to the air pressure and one of said indicating members being provided with an adjustable signal band for indicating the relative positions of the indicator members and adapted to be positioned to coincide with a range of pressure to be maintained.

4. A pressure gauge device comprising a stationary indicator member and a movable indicator member telescopically fitted thereto and operative to be movable with relation to the stationary member responsive to the air pressure and one of said indicating members being provided with graduated marking and further provided with an adjustable signal band adapted to be positioned to coincide with a range of pressure to be maintained, said signal band consisting of a split ring of a resilient material sprung upon the indicator member so as to be held by resilient pressure thereon.

5. A pressure gauge comprising a stationary indicator member and a movable indicator member telescopically fitted thereto and operative to be movable with relation to the stationary member responsive to the air pressure, said movable indicator member being provided with graduated marking and further provided with an adjustable signal band of a width to coincide with a range of pressure to be maintained, said signal band consisting of a split ring of resilient material arranged compressively to engage the indicator member and securing means provided upon the indicator member and signal band for securing the signal band in position of varied adjustment.

6. A pressure gauge comprising a stationary indicator member and a movable tubular indicator member telescopically fitted within the stationary member and operative to be movable with relation to the stationary member responsive to the air pressure, said movable indicator member having an indicating portion or length of slightly reduced diameter provided with graduated marking and having fitted thereon an adjustable signal band of a width to coincide with a range of pressure to be maintained, said signal band being formed as a split ring of resilient metal provided with an inwardly directed rib or shoulder and adapted compressively to engage the indicator member and said movable indicator member being provided with a series of annular recesses to be engaged by the rib of the signal band for yieldingly retaining the latter in varied position of adjustment.

7. A pressure gauge and valve device adapted to be permanently secured to a tubular valve sleeve having its outer end portion of reduced diameter providing a shoulder and threaded to receive a standard size coupling of an inflating device, comprising a stationary indicator member and a movable indicator member operative to be movable with relation to the stationary member responsive to the air pressure, a securing member internally threaded for securing engagement with the standard threads of the upper portion of the valve sleeve, a sealing washer interposed between the securing member and the valve sleeve, said movable plunger member being provided with an opening longitudinally therethrough and formed at its upper portions to receive therein an air intake valve and provided with a sleeve extension externally threaded to receive the standard size coupling of an inflating device, an adjustable signal band slidably mounted upon the movable indicator member and adapted for indicating a range of pressure to be maintained.

Signed at Jersey City, in the county of Hudson and State of New Jersey, this 1st day of July, A. D. 1924.

FRANK J. SCHMIDT